(12) United States Patent
Wood et al.

(10) Patent No.: US 9,094,280 B2
(45) Date of Patent: *Jul. 28, 2015

(54) COMMUNICATING NETWORK STATUS

(71) Applicant: CRADLEPOINT, INC., Boise, ID (US)

(72) Inventors: Steven Wood, Boise, ID (US); Patrick Sewall, Boise, ID (US); David A. Johnson, Boise, ID (US)

(73) Assignee: CRADLEPOINT, INC, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,848

(22) Filed: Jan. 7, 2013

(65) Prior Publication Data

US 2013/0121253 A1  May 16, 2013

Related U.S. Application Data

(63) Continuation of application No. 12/350,402, filed on Jan. 8, 2009, now Pat. No. 8,477,639, and a continuation-in-part of application No. 10/936,124, filed on Sep. 8, 2004, now Pat. No. 7,764,784.

(60) Provisional application No. 61/019,775, filed on Jan. 8, 2008, provisional application No. 61/019,874, filed on Jan. 9, 2008.

(51) Int. Cl.
*H04J 1/16* (2006.01)
*H04L 12/24* (2006.01)
(Continued)

(52) U.S. Cl.
CPC .............. *H04L 41/00* (2013.01); *H04L 43/045* (2013.01); *H04W 48/08* (2013.01); *H04L 43/0805* (2013.01); *H04L 43/0894* (2013.01); *H04W 74/06* (2013.01)

(58) Field of Classification Search
CPC .... H04W 48/08; H04W 72/085; H04W 74/06
USPC ................. 370/241–252, 328, 338, 346, 449;
709/223–225, 229; 455/404.2, 440,
455/456.1–456.6
See application file for complete search history.

(56) References Cited

U.S. PATENT DOCUMENTS

| 5,231,633 A | 7/1993 | Hluchyj et al. |
| 5,594,946 A | 1/1997 | Menich et al. |

(Continued)

FOREIGN PATENT DOCUMENTS

| EP | 1331784 A1 | 7/2003 |
| JP | 20010186565 | 7/2001 |
| KR | 20040028099 | 4/2004 |

OTHER PUBLICATIONS

Final Office Action issued in U.S. Appl. No. 10/936,124 dated Feb. 2, 2007.

(Continued)

*Primary Examiner* — Kan Yuen
(74) *Attorney, Agent, or Firm* — Parsons Behle & Latimer (57) ABSTRACT

A method for communicating network status information includes receiving, via a first link, a request for status information from a client device, the first link being a link between a router device and a client device. In response to the request, a data exchanger is polled for status information via a second link. The second link is a link between the router device and the data exchanger. The status information identifies a state of a third link between the data exchanger and a wide area network. The status information is received via the second link and communicated to the client device via the first link.

12 Claims, 7 Drawing Sheets

(51) Int. Cl.
*H04L 12/26* (2006.01)
*H04W 48/08* (2009.01)
*H04W 74/06* (2009.01)

(56) References Cited

U.S. PATENT DOCUMENTS

| | | | |
|---|---|---|---|
| 5,638,359 | A | 6/1997 | Peltola et al. |
| 5,859,628 | A | 1/1999 | Ross et al. |
| 5,864,539 | A | 1/1999 | Yin |
| 6,006,034 | A | 12/1999 | Heath et al. |
| 6,006,264 | A | 12/1999 | Colby et al. |
| 6,028,848 | A | 2/2000 | Bhatia et al. |
| 6,031,844 | A | 2/2000 | Lin |
| 6,377,825 | B1 | 4/2002 | Kennedy et al. |
| 6,389,462 | B1 | 5/2002 | Cohen et al. |
| 6,434,187 | B1 | 8/2002 | Beard et al. |
| 6,535,592 | B1 | 3/2003 | Snelgrove |
| 6,553,028 | B1 | 4/2003 | Tang |
| 6,560,442 | B1 | 5/2003 | Yost et al. |
| 6,609,197 | B1 | 8/2003 | Ketcham et al. |
| 6,611,861 | B1 | 8/2003 | Schairer et al. |
| 6,615,262 | B2 | 9/2003 | Schweitzer et al. |
| 6,621,798 | B1 | 9/2003 | Krishnan et al. |
| 6,735,447 | B1 | 5/2004 | Muller |
| 6,795,700 | B2 | 9/2004 | Karaoguz et al. |
| 6,850,495 | B1 | 2/2005 | Baum et al. |
| 6,862,444 | B2 | 3/2005 | Karaoguz et al. |
| 6,885,859 | B2 | 4/2005 | Karaoguz et al. |
| 6,967,958 | B2 | 11/2005 | Ono et al. |
| 6,987,726 | B1 | 1/2006 | Elliott |
| 7,009,941 | B1 | 3/2006 | Uchino |
| 7,095,335 | B2 | 8/2006 | De Bolster et al. |
| 7,187,923 | B2 | 3/2007 | Mousseau et al. |
| 7,213,478 | B2 | 5/2007 | Harada et al. |
| 7,317,896 | B1 | 1/2008 | Saxena et al. |
| 7,346,344 | B2 | 3/2008 | Fontaine |
| 7,382,771 | B2 | 6/2008 | Leblanc et al. |
| 7,400,903 | B2 | 7/2008 | Shoemake et al. |
| 7,421,265 | B1 | 9/2008 | Liu |
| 7,558,199 | B1 * | 7/2009 | Minei et al. ........... 370/230 |
| 7,617,317 | B2 | 11/2009 | Jones et al. |
| 7,620,065 | B2 | 11/2009 | Falardeau |
| 7,675,862 | B2 | 3/2010 | Pham et al. |
| 7,764,784 | B2 | 7/2010 | Sewall |
| 7,813,314 | B2 | 10/2010 | Fulknier et al. |
| 8,046,000 | B2 | 10/2011 | Sylvain |
| 8,077,681 | B2 | 12/2011 | Ahmavaara et al. |
| 8,090,807 | B2 | 1/2012 | Chung et al. |
| 8,126,145 | B1 | 2/2012 | Tewari et al. |
| 8,477,639 | B2 * | 7/2013 | Sewall et al. ........... 370/252 |
| 2001/0039580 | A1 | 11/2001 | Walker et al. |
| 2001/0046870 | A1 | 11/2001 | Stilp et al. |
| 2001/0048683 | A1 | 12/2001 | Allen |
| 2002/0025832 | A1 | 2/2002 | Durian et al. |
| 2002/0062372 | A1 | 5/2002 | Hong et al. |
| 2002/0118663 | A1 | 8/2002 | Dorenbosch et al. |
| 2003/0043755 | A1 | 3/2003 | Mitchel |
| 2003/0045295 | A1 | 3/2003 | Stanforth |
| 2003/0046396 | A1 | 3/2003 | Richter et al. |
| 2003/0059005 | A1 | 3/2003 | Meyerson et al. |
| 2003/0126252 | A1 | 7/2003 | Abir |
| 2003/0200308 | A1 | 10/2003 | Tameda et al. |
| 2003/0212800 | A1 | 11/2003 | Jones et al. |
| 2003/0235175 | A1 | 12/2003 | Naghian et al. |
| 2004/0003071 | A1 | 1/2004 | Mathew et al. |
| 2004/0038697 | A1 | 2/2004 | Attar et al. |
| 2004/0049576 | A1 | 3/2004 | Schweitzer et al. |
| 2004/0068502 | A1 | 4/2004 | Vogedes |
| 2004/0110544 | A1 | 6/2004 | Oyagi et al. |
| 2004/0133689 | A1 | 7/2004 | Vasisht |
| 2004/0133793 | A1 | 7/2004 | Ginter et al. |
| 2004/0139170 | A1 | 7/2004 | Shen et al. |
| 2004/0152449 | A1 | 8/2004 | Koshihara |
| 2004/0153676 | A1 | 8/2004 | Krantz et al. |
| 2004/0185876 | A1 | 9/2004 | Groenendaal et al. |
| 2004/0205154 | A1 | 10/2004 | Dalton et al. |
| 2004/0205155 | A1 | 10/2004 | Nobakht et al. |
| 2004/0218544 | A1 | 11/2004 | Lee |
| 2004/0250136 | A1 | 12/2004 | Albertine Trappeniers et al. |
| 2005/0008017 | A1 | 1/2005 | Datta et al. |
| 2005/0014525 | A1 | 1/2005 | Tsunehara et al. |
| 2005/0022013 | A1 | 1/2005 | Schwenk |
| 2005/0038905 | A1 | 2/2005 | Banes et al. |
| 2005/0044235 | A1 | 2/2005 | Balahura |
| 2005/0047326 | A1 | 3/2005 | Puon et al. |
| 2005/0086346 | A1 | 4/2005 | Meyer |
| 2005/0101340 | A1 | 5/2005 | Archiable |
| 2005/0108573 | A1 | 5/2005 | Bennett et al. |
| 2005/0198234 | A1 | 9/2005 | Leib et al. |
| 2005/0198319 | A1 | 9/2005 | Chan et al. |
| 2005/0221850 | A1 | 10/2005 | Kashiwase |
| 2005/0233728 | A1 | 10/2005 | Karaoguz et al. |
| 2005/0245233 | A1 | 11/2005 | Anderson |
| 2005/0246434 | A1 | 11/2005 | Bantz et al. |
| 2005/0259645 | A1 | 11/2005 | Chen et al. |
| 2005/0259654 | A1 | 11/2005 | Faulk, Jr. |
| 2005/0262248 | A1 | 11/2005 | Jennings, III et al. |
| 2005/0267965 | A1 | 12/2005 | Heller |
| 2006/0025141 | A1 | 2/2006 | Marsh et al. |
| 2006/0047823 | A1 | 3/2006 | Cheng |
| 2006/0053290 | A1 | 3/2006 | Randle |
| 2006/0072474 | A1 | 4/2006 | Mitchell |
| 2006/0077607 | A1 | 4/2006 | Henricks et al. |
| 2006/0133582 | A1 | 6/2006 | McCulloch |
| 2006/0153216 | A1 | 7/2006 | Hosein et al. |
| 2006/0171402 | A1 | 8/2006 | Moore et al. |
| 2006/0184670 | A1 | 8/2006 | Beeson et al. |
| 2006/0187890 | A1 | 8/2006 | Lin |
| 2007/0002846 | A1 | 1/2007 | Rada et al. |
| 2007/0030857 | A1 | 2/2007 | Fulknier et al. |
| 2007/0081469 | A1 | 4/2007 | Tracy et al. |
| 2007/0083606 | A1 | 4/2007 | Malik et al. |
| 2007/0147324 | A1 | 6/2007 | McGary |
| 2007/0153689 | A1 | 7/2007 | Strub et al. |
| 2007/0177555 | A1 * | 8/2007 | Brueck et al. ........... 370/338 |
| 2007/0233879 | A1 | 10/2007 | Woods et al. |
| 2007/0254727 | A1 | 11/2007 | Sewall |
| 2007/0255848 | A1 * | 11/2007 | Sewall et al. ........... 709/232 |
| 2007/0291711 | A1 | 12/2007 | Welch et al. |
| 2008/0005108 | A1 | 1/2008 | Ozzie et al. |
| 2008/0008165 | A1 | 1/2008 | Ikeda et al. |
| 2008/0039102 | A1 | 2/2008 | Sewall |
| 2008/0043626 | A1 | 2/2008 | Pham et al. |
| 2008/0043673 | A1 | 2/2008 | Johnson et al. |
| 2008/0046561 | A1 | 2/2008 | Pham et al. |
| 2008/0049630 | A1 | 2/2008 | Kozisek et al. |
| 2008/0056222 | A1 | 3/2008 | Waites |
| 2008/0117860 | A1 | 5/2008 | Rodriguez et al. |
| 2008/0159167 | A1 | 7/2008 | Ito et al. |
| 2008/0178172 | A1 | 7/2008 | Dossa et al. |
| 2008/0250478 | A1 | 10/2008 | Miller et al. |
| 2008/0259841 | A1 | 10/2008 | Deshpande |
| 2008/0267195 | A1 | 10/2008 | Belmon |
| 2008/0310407 | A1 | 12/2008 | Sewall |
| 2009/0007096 | A1 | 1/2009 | Chavez et al. |
| 2009/0015419 | A1 | 1/2009 | Sewall |
| 2009/0030908 | A1 | 1/2009 | Kawabe |
| 2009/0063667 | A1 | 3/2009 | Smith et al. |
| 2009/0109959 | A1 | 4/2009 | Elliott et al. |
| 2009/0129319 | A1 | 5/2009 | Buddhikot et al. |
| 2009/0138447 | A1 | 5/2009 | Kalavade |
| 2009/0147700 | A1 | 6/2009 | Sewall |
| 2009/0168789 | A1 | 7/2009 | Wood |
| 2009/0172658 | A1 | 7/2009 | Wood |
| 2009/0172796 | A1 | 7/2009 | Wood |
| 2009/0175285 | A1 | 7/2009 | Wood et al. |
| 2009/0180395 | A1 | 7/2009 | Wood et al. |
| 2009/0182845 | A1 | 7/2009 | Johnson |
| 2009/0207003 | A1 | 8/2009 | Brekke et al. |
| 2010/0014415 | A1 | 1/2010 | Moeller |
| 2010/0118846 | A1 | 5/2010 | Moeller |
| 2010/0202450 | A1 | 8/2010 | Ansari et al. |
| 2010/0231790 | A1 | 9/2010 | Ansari et al. |

(56) References Cited

U.S. PATENT DOCUMENTS

2011/0051703 A1  3/2011  Fulknier et al.
2011/0167157 A1  7/2011  Virgilio et al.
2011/0199932 A1  8/2011  Short et al.

OTHER PUBLICATIONS

Final Office Action issued in U.S. Appl. No. 10/936,124, dated Feb. 9, 2009.
Final Office Action issued in U.S. Appl. No. 10/936,124, dated Jul. 11, 2007.
Final Office Action issued in U.S. Appl. No. 10/936,124, dated Sep. 3, 2009.
Office Action issued in U.S. Appl. No. 10/936,124 dated Apr. 10, 2008.
Office Action in U.S. Appl. No. 10/936,124 dated Jun. 26, 2006.
Final Office Action issued in U.S. Appl. No. 11/673,965 dated Apr. 1, 2010.
Office Action issued in U.S. Appl. No. 11/673,965 dated Sep. 2, 2009.
Advisory Action issued in U.S. Appl. No. 11/376,973 dated Mar. 19, 2010.
RFC 2181 Clarifications to the DNS Specification, Internet Engineering Task Force, http://tools.ietf.org/html/rfc2181, 1 page.
RFC 2136 Dynamic Updates in the Domain Name System (DNS Update), Internet Engineering Task Force, 51 pages.
Final Office Action issued in U.S. Appl. No. 11/673,973 dated Dec. 10, 2009.
Office Action issued in U.S. Appl. No. 11/673,973 dated May 28, 2009.
Office Action issued in U.S. Appl. No. 11/673,973 dated Jun. 24, 2013.
Proxy Server, http://en.wikipedia.org/wiki/Proxy_server ; 9 pages.
Final Office Action issued in U.S. Appl. No. 11/673,956 dated Apr. 15, 2010.
Office Action issued in U.S. Appl. No. 11/673,956 dated Sep. 2, 2013.
Office Action issued in U.S. Appl. No. 12/172,862 dated Aug. 31, 2013.
Office Action issued in U.S. Appl. No. 12/172,885 dated Apr. 26, 2010.
Office Action issued in U.S. Appl. No. 12/350,407 dated Apr. 5, 2010.
International Search Report & Written Opinion of the International Searching Authority for Application No. PCT/US2007/062077, dated Nov. 20, 2007.
International Search Report & Written Opinion of the International Searching Authority for Application No. PCT/US2007/062078, dated Mar. 5, 2008.
International Search Report & Written Opinion of the International Searching Authority for Application No. PCT/US2007/062079, dated Nov. 8, 2007.
International Search Report and Written Opinion of the International Searching Authority for Application No. PCT/US2008/076836, dated Mar. 6, 2009.
International Search Report and Written Opinion of the International Searching Authority for Application No. PCT/US2008/083409, dated May 12, 2009.
Office Action issued in U.S. Appl. No. 12/172,862 dated Feb. 14, 2011.
Office Action issued in U.S. Appl. No. 11/673,965 dated Feb. 15, 2011.
Office Action issued in U.S. Appl. No. 12/270,419 dated Dec. 17, 2010.
Final Office Action issued in U.S. Appl. No. 12/172,885 dated Nov. 1, 2010.
Office Action issued in U.S. Appl. No. 12/350,407 dated Dec. 14, 2010.
Office Action issued in U.S. Appl. No. 11/673,956 dated Dec. 22, 2010.
Motion Technology, Inc. Introduces Industry's First 3G Hotspot for Passenger Productivity.
MikroTik Router OS V28 Reference Manual, p. 1-521 Document revision 2.5 (Wed Apr. 21, 2010;49;51 GMT 2004) www.mikrotic.com.
Software Engineering, IEEE Transactions on, vol. 23, No. 12, pp. 745-758, Dec. 1997.
Office Action dated Jul. 27, 2011 for U.S. Appl. No. 12/172,862.
Final Office Action dated Aug. 4, 2011issued in U.S. Appl. No. 11/673,965.
Non-final Office Action dated Aug. 10, 2011 issued in U.S. Appl. No. 11/673,956.
Final Office Action issued in U.S. Appl. No. 12/270,419, dated Jul. 2, 2011.
Final Office Action issued in U.S. Appl. No. 12/350,407, dated Jul. 6, 2011.
Office Action, U.S. Appl. No. 12/350,405, dated Feb. 16, 2012.
Final Office Action dated Mar. 15, 2012 issued in U.S. Appl. No. 12/843,541.
Office Action issued in U.S. Appl. No. 12/350,402, dated Apr. 16, 2012.
Router (2009) Webster's New World Telecom Dictionary http://www.yourdictionary.com/telecom/router(2 of 3)Aug. 28, 2009.
Office Action issued in U.S. Appl. No. 12/843,541 dated Jul. 18, 2012.
Final Office Action for U.S. Appl. No. 12/172,862 dated Apr. 24, 2012.
Office Action issued in U.S. Appl. No. 12/270,419 dated Mar. 27, 2012.
Final Office Action issued in U.S. Appl. No. 12/350,407 dated Jan. 3, 2012.
Office Action issued in U.S. Appl. No. 12/351,502 dated Apr. 25, 2012.
Office Action dated Aug. 20, 2012 issued in U.S. Appl. No. 12/172,862.
Office Action dated Sep. 23, 2014, issued in CA 2730490.
Office Action dated Sep. 24, 2014, issued in CA 2730483.

* cited by examiner

COMMUNICATING NETWORK STATUS

CROSS REFERENCE TO RELATED APPLICATIONS

This application is a continuation application of co-pending U.S. patent application Ser. No. 12/350,402, filed Jan. 8, 2009 entitled "Communicating Network Status," which claims priority from provisional applications 61/019,775 entitled "Client Application Provides WAN Status" filed Jan. 8, 2008 and 61/019,874 entitled "Intelligent Switching Between Multiple Available WAN Connections" filed Jan. 9, 2008, and which also is a continuation-in-part of U.S. patent application Ser. No. 10/936,124 filed Sep. 8, 2004, issued as U.S. Pat. No. 7,764,784 on Jul. 27, 2010, entitled "Handset Cradle." The disclosures of each are hereby incorporated by reference in their entirety.

BACKGROUND

Routers allow client devices in a local area network (LAN) to access a wide area network (WAN). Links between client devices and the router may be wired or wireless. Similarly, links between the router and the Wide Area Network may be wired or wireless. Wireless links to the WAN may be through cellular network. While the user of a client device can usually discern the status of the link between the client device and the router, identifying the status of the link between the router and the WAN can prove more complicated. This is especially true with wireless WAN links.

For example, the strength and speed of a wireless cellular WAN link depends upon the router's proximity to a cell tower. When the router is in motion or changes location, the signal strength may change or become intermittent. However, the user cannot easily discern if problems caused by the intermittent link are the result of a poor WAN connection, a problem with the ISP, or a problem with the web site being accessed.

DETAILED DESCRIPTION

Introduction:

Various embodiments described below operate to provide a client device with status information concerning a data link between a router device and a wider area network (WAN). Such can prove to be especially useful when the link between the router device and the WAN is wireless and prone to changes in signal strength and link speed. In a particular example, an application executed by the client device interacts with the router device to obtain and ultimately display the status information to a user.

Figure 1:
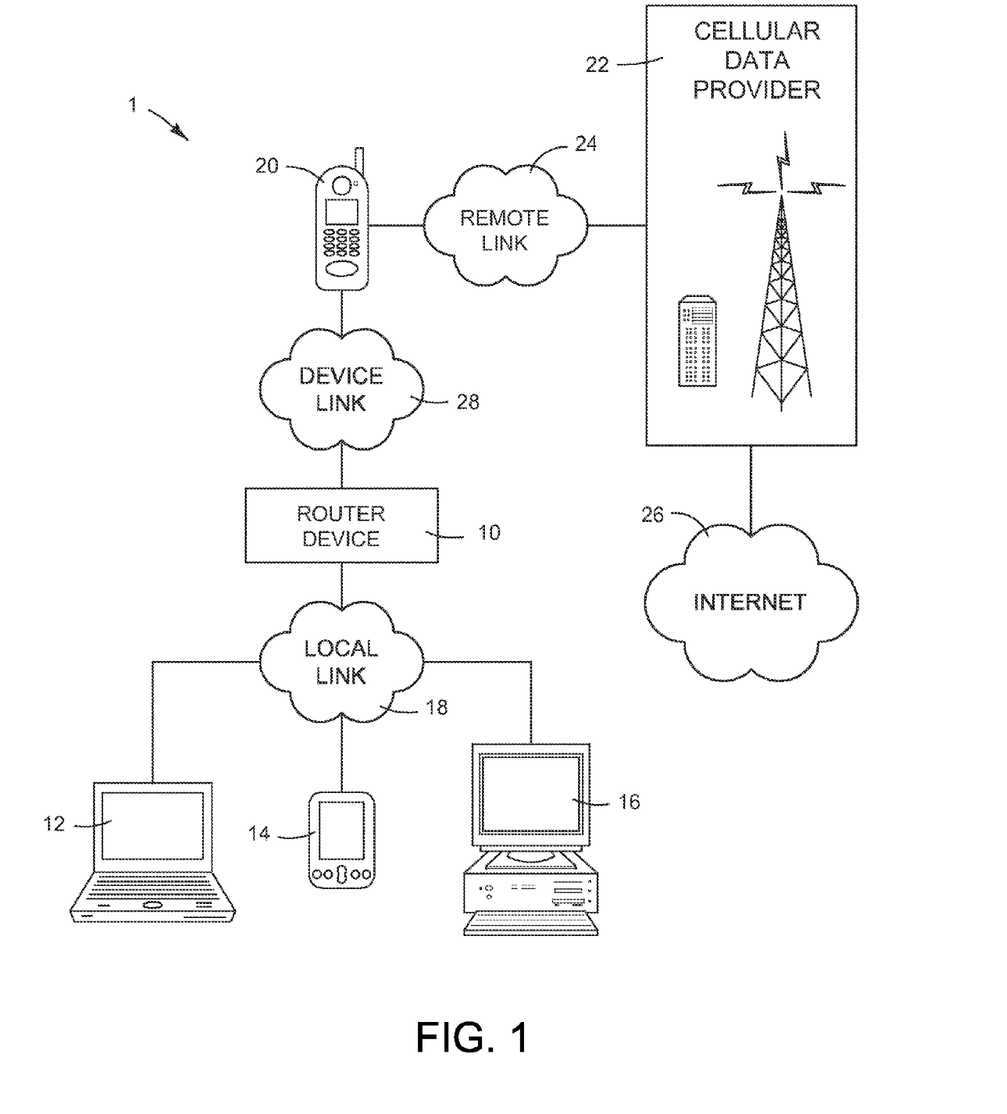
FIGS. 1-3 illustrate an exemplary block diagrams of environments in which embodiments of the present invention can be implemented.

Environment:

FIG. 1 illustrates exemplary environment 1 in which various embodiments of the present invention may be implemented. Environment 1 includes router device 10 and clients 12, 14, and 16 and local link 18. Clients 12, 14, and 16 represent generally any computing devices capable of communicating with router device 10. Router device 10, discussed in more detail later, represents generally a device capable of connecting to clients 12, 14, and 16 and performing one or more tasks as guided by a connected client. In the following examples, router device is described as a router device. However, implementation of various embodiments is not so limited. For example, router device 10 could be a printer or a scanner.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger 20 represents generally and combination of hardware and programming that can be utilized by router device 10 to connect to a remote network such as the internet. While illustrated as an internet enabled cellular telephone, data exchanger 20 is not so limited. Other examples include but are not limited to DSL modems and cable modems.

Service provider 22 represents generally any infrastructure configured to provide internet related data services to subscribers such as an owner of data exchanger 20. For example, where data exchanger 20 is an internet enabled cellular telephone, service provider 22 may be a cellular telephone service provider capable of providing voice and data services to subscribers allowing access to internet 26. Where data exchanger 22 is a DSL or cable modem, service provider 22 may be a more traditional internet service provider (ISP) providing data access to internet 26.

Remote link 24 is a data link that interconnects data exchanger 20 and service provider 22. Remote link 24 represents generally any combination of a cable, wireless, or remote connection via a telecommunication link, an infrared link, a radio frequency link, or any other connector or system that provides electronic communication between data exchanger 20 and service provider 22.

In the embodiment illustrated in environment 1, device link 28 interconnects router device 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying communications of any one of a number of protocols such as Bluetooth.

Communication between clients 12, 14, and 16 and internet 26 is dependent upon router device 10. Router device 10, as discussed below with respect to FIGS. 3-6, includes components capable of distinguishing among the user's of clients 12, 14, and 16, and applying different internet access rules for different users.

Figure 2:
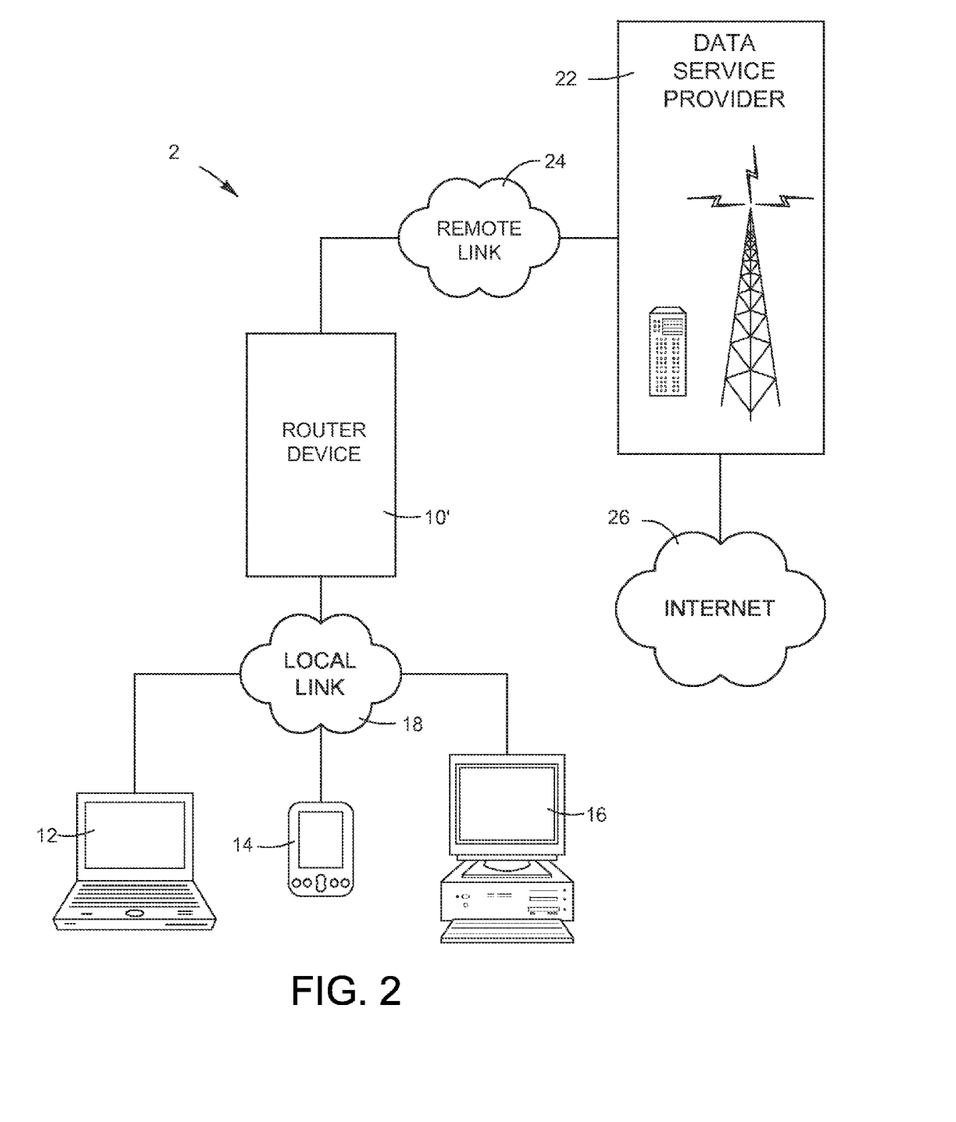

FIG. 2 illustrates exemplary environment 2 in which various embodiments of the present invention may be implemented. In the example of FIG. 2, data exchanger 20 (not shown) and router device 10' are incorporated within the same device. Device link 32 (shown in FIG. 1) is eliminated and replaced with internal connections. In such a scenario, data exchanger may take the form of a separate card that can be inserted into a slot provided by router device 10, or dongle connected to the router device 10 through an I/O port. Alternatively, data exchanger 20 may be fully integrated into router device 10. In any event, device link 28 (FIG. 1) while not apparent in FIG. 2 is internal to router device 10'.

Figure 3:
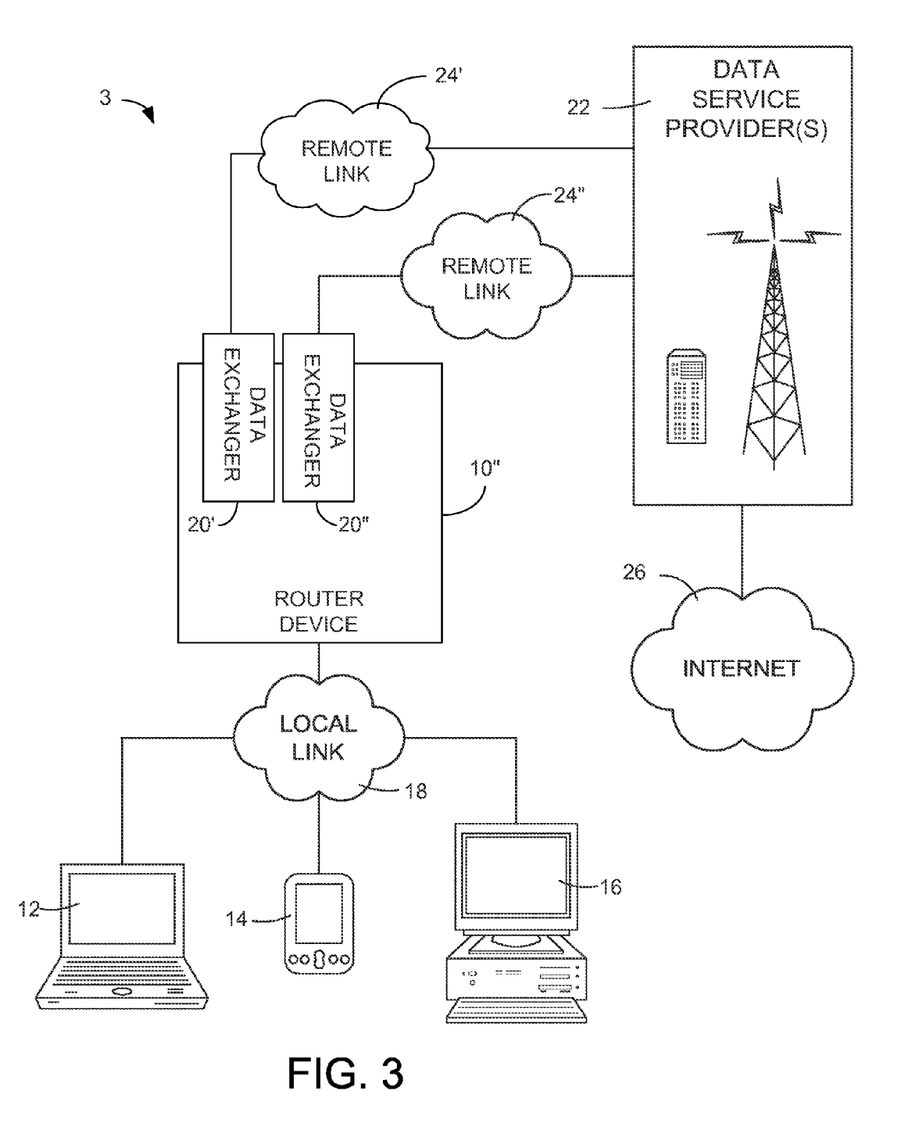

FIG. 3 illustrates exemplary environment 3 in which various embodiments may be implemented. In the example of FIG. 3, router device 10" is configured to utilize two data exchangers 10' and 10". In this manner two remote links 24' and 24" can be established with one or more data service providers 22, thus, establishing two separate paths for routing data communications between clients 12-16 and the internet 26. In FIG. 3, data exchangers 20' and 20" appear as dongles or cards connected to separate I/O ports of router device 10". In other examples, one data exchanger 10' or 10" may be a data enabled cellular telephone while the other may be a DSL or cable modem. Alternatively, one or both of data exchangers 20' and 20" may be fully integrated into router device 10. In any event, device link 28 (FIG. 1) while not apparent in FIG. 3 is internal to router device 10"

Figure 4:
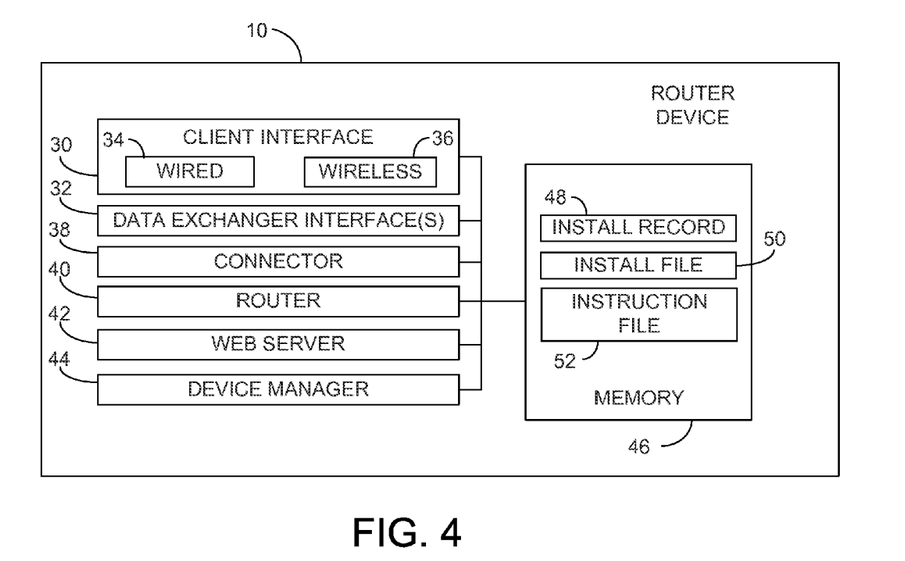
FIGS. 4-7 are block diagrams showing physical and logical components of a Router according to an embodiment of the present invention.

Router Device:

FIG. 4 is a block diagram illustrating physical and logical components of router device 10. In this example, router device 10 represents generally any combination of hardware and programming capable routing network communications between clients on the local network and between the clients and the internet via a data exchanger such as an internet enabled cellular telephone, cellular data card or dongle, or DSL or cable modem. In the example of FIG. 3 router device 10 includes client interface 30 and data exchanger interface 32. Client interface 30 represents generally any combination of hardware and program instructions capable of supplying a communication interface between router device 10 and clients 12, 14, and 16 shown in FIGS. 1 and 2.

Data exchanger interface 32 represents any combination of hardware and programming enabling data to be communicated between router device 10 and one or more data exchangers 20, 20', and 20" shown in FIGS. 1 and 3. Client interface 30 is shown to include wired interface 34 and wireless interface 36. Wired interface 34 represents generally any interface through which communications can pass between router device 10 and clients 12, 14, and 16 via one or more physical wires. Wired interface 34 may include one or more serial or parallel ports including but not limited to USB and FireWire ports. Wireless interface 36 represents generally any interface through which information can be exchanged between router device 10 and clients 12, 14, and 16 via a wireless protocol such as ultrawideband (UWB), Bluetooth, or 802.11.

Router device 10 also includes connector 38, router 40, web server 42, device manager 44, and memory 46. Connector 38 represents generally any combination of hardware and programming for being used to send signals for controlling data exchangers of various types. In the example of FIG. 3, router device 10" utilizes data exchangers 20' and 20". Data exchangers 20' and 20" may be from different manufactures and may be designed to interact with different data service providers. Thus, connector 38 utilizes different signals for each data exchanger 20' and 20" to achieve the same result. Connector 40 is responsible sending appropriate signals to cause a data exchanger to establish a remote link with a data service provider so that access can be made to internet 26. Connector 40 is also responsible for sending signals to poll a data exchanger for status information identifying a state of the remote link between the data exchanger and a wider area network (WAN) represented by internet 26 in FIGS. 1-3.

Where the remote link is wireless such as a data link established between a data enabled cellular device, the status information can identify a signal strength of the remote link, a data transfer rate of the remote link, as well as position data for the data exchanger. For a data enabled cellular device, the signal strength is a function of the proximity of the data exchanger and a cell tower or other transceiver with which the data exchanger communicates. Improved signal strength can allow for improved data transfer rates. Certain data enabled cellular devices are capable of communicating with a server in the internet to obtain position data. This position data can identify the current geographic location of the data exchanger. The position data can also be used to guide a user from a current position to a desired position. The status information may include such positioning and repositioning data for use in guiding a user from a current location to a desired location. A particular desired location may be a location with improved signal strength for a remote link. This desired location may be simple directional information leading the user closer to one or more cell towers. The desired location may a public location such as a coffee shop, mall, or other place of business strategically positioned near a cell tower for improved signal strength.

Router 40 represents generally any combination of hardware and programming for routing network communication received through client interface 30 to be transmitted by data exchanger 20 to internet 26. Router 40 is also responsible for routing inbound network communications received from internet 26 and directed via client interface 30 to a specified client 12, 14, or 16. Outbound and inbound network communications, for example can be an IP (internet Protocol) packets directed to a target on internet 26 or to a particular network device 12, 14, or 16 on a local area network.

Web server 42 represents generally any combination of hardware and programming capable of serving interfaces such as web pages to clients 12, 14, and 16. Such web pages may include web pages that when displayed by a network device allows a user to provide or otherwise select settings related to the operation of router device 10.

Figure 5:
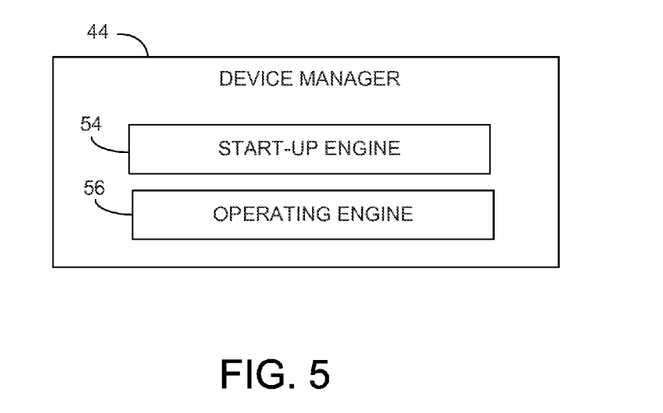
Figure 6:
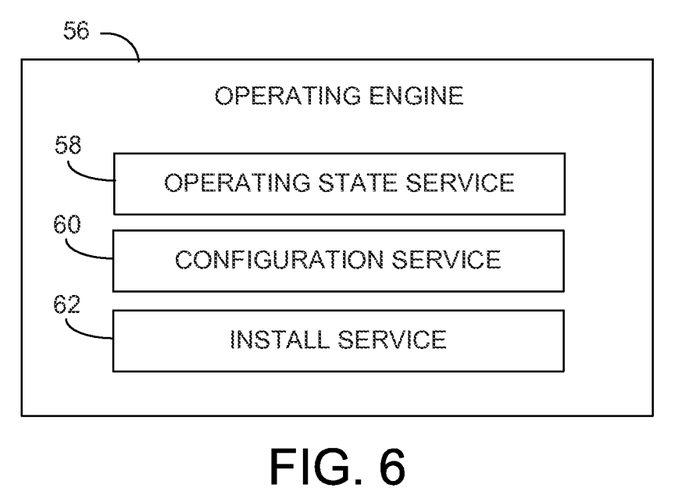

Device manager 44, discussed in more detail below with respect to FIGS. 4-6, represents generally any combination of hardware and programming capable of managing the configuration of router device 10 as well as interacting with a client device to supply status information concerning router device 10, data exchangers being utilized by router device 10 and any remote links established by those data exchangers. One particular task assigned to device manager 44 is providing for the installation of an application on a client. The application is used to obtain status information from device manager 44.

With respect to application installation, device manager 44 is configured to detect the initiation of a link between a client and client interface 30 and to determine an application state. The application state is an indication as to whether or not the application has already been installed on the client. Upon a determination that the application state is not active, device manager 44 provides for the installation of the application, sets the application state to active, and enables router device 10 to perform tasks as guided by the client.

Memory 46 represents generally one or more computer readable mediums capable of storing data that is accessible to device manager 44 and web server 42. As shown memory 46 includes install record 48, install file 50, and instruction file 52. Install record 48 represents generally any data that can be used by device manager 44 to determine the application state. Install file 50 represents generally a program that can be executed by a client to install an application. Instruction file 52 represents generally a script that can be executed by an operating system of a client to cause that client to automatically execute install file 50. For example, device manager 44 can cause router device 10 to appear as a mass storage device when connected to a client. As a result, the operating system of the client parses memory 46, locates and executes instruction file 52 resulting in the installation of the application. Where the operating system is Microsoft® Windows®, instruction file may be referred to as an "autorun" file.

FIG. 5 is a block diagram illustrating physical and logical components of device manager 44. In this example, device manager 44 is shown to include start-up engine 54 and operating engine 56. Start-up engine 54 represents generally any combination of hardware and programming configured to provide for the installation of the application on a client. Start-up engine 54 is discussed in more detail below with respect to FIG. 7. Operating engine 56, discussed in more detail below with respect to FIG. 6, represents generally and combination of programming and hardware configured to manage the operational configuration of router device 10.

Referring now to FIG. 6, operating engine 56 is shown to include operating state service 58, configuration service 60, and install service 62. Operating state service 58 represents generally any combination of hardware and programming configured to detect and report status information concerning router device 10, data exchangers being utilized by router device 10 and any remote links established by those data exchangers.

Operating state service 58 is configured to receive requests for status information from a client device. Referring to FIGS. 1-4, those requests are received via local link 18 established by client interface 30. In response to the request, operating state service 58 is configured to utilize connector 40 to poll one or more data exchangers being utilized by router device 10 via corresponding device links 28 between router device 10 and the data exchangers. Operating state service 58 polls the data exchangers for status information concerning remote links 24, 24', 24" established with a wide area network such as the internet. Operating state service 58 receives the status information via the corresponding device links 28 and then communicates the status information to the requesting client device via local link 18.

Operating state service 58 may communicate the status information via web server 42 (FIG. 4). An application installed on the client device using install file 50 (FIG. 4), when executed may issue the request for the status information. That request is received by web server 42 and passed to operating state service 58. Once the status information is received, operating state service 58 then utilizes web server 42 to return the status information to the application. The application can then use the status information to inform the user the status of any remote links being used by router device to access a wide area network. For example, the application can inform the user of the strength of the remote links, current transfer data rates, and positioning data.

Configuration service 60 represents generally any combination of hardware and programming configured to generate or otherwise supply one or more configuration web pages to web server 42 to be returned via web server 42 to a requesting client. The configuration pages may include information relating to the operating states detected by operating state manager. The configuration pages may also include controls enabling a user to request changes to the operating state of router device. Such changes are received by web server 42 and implemented by operating state service 58. Install service 62 represents generally any combination of hardware and programming configured to generate or otherwise supply one or more installation pages to web server 42 to be returned to a requesting client. The installation pages when provided to a client, enable the client to download install file 50. The downloading of install file 50 may be manual or automatic. Furthermore, once downloaded, the install file 50 may be manually or automatically executed to install the application.

Figure 7:
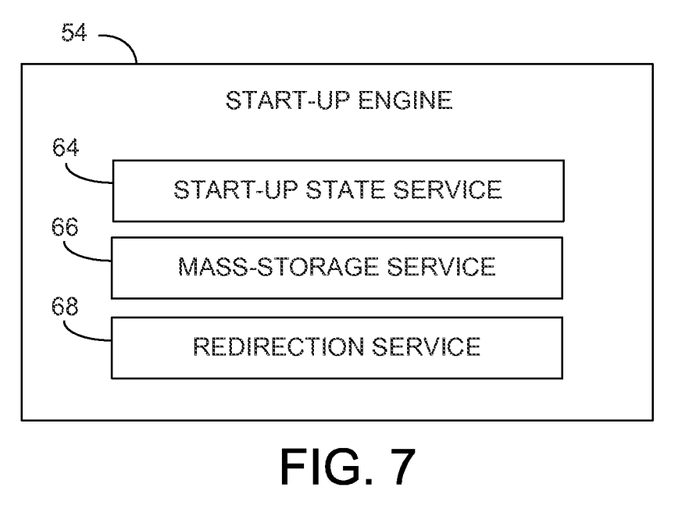

Referring to FIG. 7, start-up engine 54 is shown to include start-up state service 64, mass storage service 66, and redirection service 68. Start-up state service 64 represents generally any combination of hardware and programming configured to detect the initiation of a link between client interface 30 and a client, to determine the application state, and to set or otherwise configure the application state. In particular, upon a determination that the application state is not active, start-up state service 64 is configured to utilize mass-storage service 66 if the detected link is a wired connection or to utilize redirection service 68 if the detected link is a wireless connection.

Mass-storage service 66 represents generally any combination of hardware and programming configured to present router device 10 as a mass-storage device. When presented as a mass storage device with a wired connection to a client, the client can access and utilize memory 46. In particular, the operating system of the client will identify and execute instruction file 52, causing the client to execute installation file 50. Thus, when start-up state service 64 detects the initiation of a wired detection and determines that the application state is not active, start-up state service 64 causes mass-storage service 66 to present router device 10 as a mass-storage device.

Redirection service 68 represents generally any combination of hardware and programming configured to redirect a request from a browser operating on a client to install service 62. When redirected, install service automatically causes or allows a user to download install file 50. Thus, when start-up state service 64 detects the initiation of a wireless detection and determines that the application state is not active, start-up state service 64 causes redirection service 68 to redirect the next or a subsequent browser request to install service 62. For example, a browser operating on the client may request a page from the internet. Instead of routing the request, redirection service 68 causes install service 62 to return a web page that causes or allows a user to download install file 50.

Start-up state service 64 can be configured to detect the application state in a number of manners. As described, install record 48 (FIG. 3) represents generally any data that can be used by device manager 44 to determine the application state. In particular, install record 48 is utilized by start-up state service 64. In one implementation, install record 48 can be a flag that is either set or not set. A set flag, for example, may represent an active application state. When not set, the flag represents an application state that is not active. Thus, upon detecting the initiation of a link between client interface 30 and a client, start-up state service 64 examines install record 48 to determine whether or not the flag is set. If not set, start-up state service 64 determines that the application state is not active and provides for the installation of the application. Subsequently, the start-up state service 64 sets the flag to configure the application state as active. Thus, when the initiation of a link is again detected, start-up state service 64 examines install record 48, identifies that the flag is set, determines that the application state is active, and concludes that, at a minimum, an attempt has already been made to install the application. It is noted that the flag, by default, is not set. It is set only after start-up state service 64 has provided for the installation of the application. It is also noted that router device 10 may include a feature to reset its settings to factory defaults. In such a case, resetting may configure the flag so that it is not set to indicate an application state that is no longer active.

In other implementations, install record 48 may be more complex. For example, install record 64 may include data identifying the client, data identifying the current version of the application, and data identifying the version of that application, if any, that is installed on the client. The data identifying the client may be the client's hardware address, network address, or user credentials used to initiate a link with router device 10. If the current version is newer than the installed version or if there is no installed version, then the application state is not active. Otherwise the application state is active. Thus, upon detecting the initiation of a link between client interface 30 and a client, start-up state service 64 determines if the client is identified in install record 48. If not, the application state is determined to not be active. If the install record 48 identifies the client, start-up state service 64 compares the version of the application, if any, installed on the client with the current version. If no application is installed or if the current version is newer, the application state is determined not to be active. Otherwise, the application state is determined to be active. Upon determining that the application state is not active, start-up state service 64 provides for the installation of the application. Subsequently, start-up state service 64 updates install record 48 to reflect that the current version of the application has been installed on the client. Thus, when the initiation of a link with that same client is again detected, start-up state service 64 examines install record 48, identifies that the installed version is the same as the current version, and determines that the application state is active.

In another implementation, start-up state service 64 may be configured to determine the application state by querying the client connecting to client interface 30. In doing so, start-up state service 64 determines if the current version of the application is installed on the client. If so, the application state is active, otherwise, it is not.

As discussed, install file 50 (FIG. 3) represents generally a program that can be executed by a client to install an application. Install file 50 can take a number of forms. For example, install file 50 may be a self contained executable. Install file 50, when executed, may cause the client to access the internet and download and install the application. Install file 50 may be executable by a browser operating on the client to install the application in the form of a browser extension. That extension may be installed by install file 50, or install file 50 may cause the browser to download and install the extension.

Start-up state service 64 may periodically communicate via internet 26 to identify the current version of the application. Where install file 50 is a self contained executable and the current version is newer than the version stored in memory 46, start-up state service 64 downloads and stores the current version in memory 46 and updates install record 48 to reflect the current version. Where install record 48 is a flag, that flag is configured to reflect an application state that is not active. In other implementations, install record 48 is updated to identify the current application version. Where install file 50 is configured to download and install the application from internet 26, start-up state service 64 may, upon detection of the availability of a new version, update install record 48 to identify that that new version. In this manner, new application versions are installed on the client as they become available.

Figure 8:
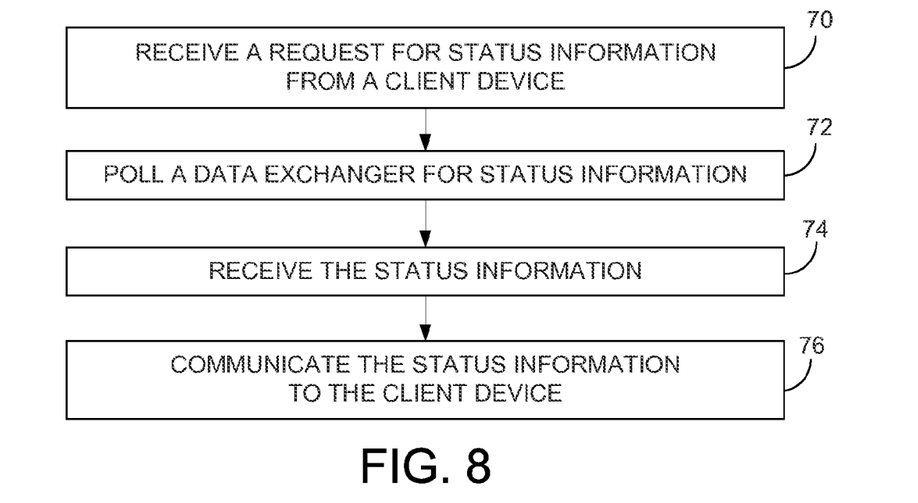
FIG. 8-9 are exemplary flow diagrams illustrating steps taken in performance of various embodiments of the present invention.
Figure 9:
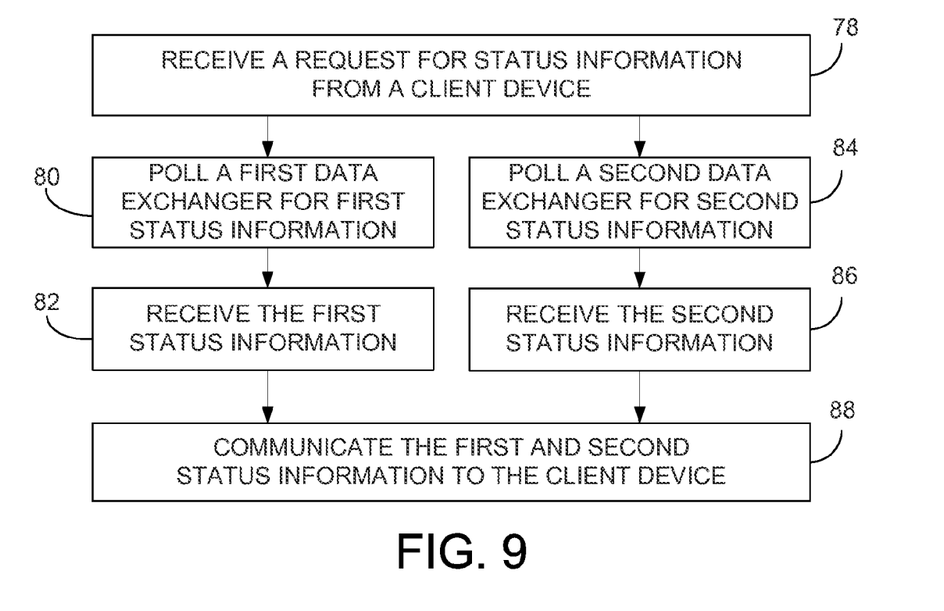

Operation:

The operation of embodiments of the present invention will now be described with reference to FIGS. 8-9. FIG. 8 is an exemplary flow diagram that helps illustrate actions taken to provide a client device with status information concerning a remote link with a WAN established for a router device by a data exchanger. FIG. 9 is an exemplary flow diagram that helps illustrate actions taken to provide a client device with status data for multiple remote links established with a WAN for a router device by multiple data exchangers.

Starting with FIG. 8, a request for status information is received from a client device with a first link (step 70). The first link is a data link between the client device and a router device. In response to the request, a data exchanger being utilized by the router device is polled, via a second link, for status information (step 72). The second link is a data link between the router device and the data exchanger. The status information identifies a state of third connection serving as a data link between the data exchanger and a wide area network. The status information is received via the second link (step 74). The status information is then communicated to the client device via the first connection (step 76).

Comparing environment 1 of FIG. 1 with the method Charted in FIG. 8, local link 18 is the first link. Device link 28 is the second link, and remote link 24 is the third link. The request for status data may originate from an application installed on the client device. Thus, while not illustrated, the method charted in FIG. 8 may include providing for the installation of the application on the client device from the router device. Further, step 70 may involve receiving the request for status information from that application once installed on the client device.

Moving on to FIG. 9, a request for status information is received from a client device with a first link (step 78). The first link is a data link between the client device and a router device. The router device is configured to utilize multiple data exchangers. In the example of FIG. 9, the router device is configured to utilize a first data exchanger and a second data exchanger. The first data exchanger is polled, via a second link, for first status information in response to the request received in step 78 (step 80). The second link is a data link between the router device and the first data exchanger. The first status information identifies a state of a third connection serving as a data link between the first data exchanger and a wide area network. The first status information is received via the second link (step 82).

Also in response to the request received in step 78, the second data exchanger is polled for second status information via a fourth link (step 84). The fourth link is a data link between the router device and the second data exchanger. The second status information identifies a state of a fifth link serving as a data link between the second data exchanger and the wide area network. The second status information is received via the fourth link (step 86). The first and second status information is then communicated to the client device via the first link (step 88).

Comparing environment 3 of FIG. 3 with the method Charted in FIG. 9, local link 18 is the first connection. Device links (not shown) connecting router device 10" to data exchangers 20' and 20" serve as the second and fourth links. Remote links 24' and 24" serve as the third and fifth links.

With respect to FIGS. 8 and 9, where a given data exchanger is a data enabled cellular communication device the third and fifth links are cellular data links. Polling for status information in steps 72, 80, and 84 may involve polling for one or more of a signal strength of the cellular data link, a data transfer rate of that link, as well as position data for the particular data exchanger. Polling for status information in steps 72, 80, and 84 can also involve polling for repositioning data that indicates a direction or a location for repositioning the given data exchanger to realize improved signal strength of the cellular data link.

EXAMPLES

Figure 10:
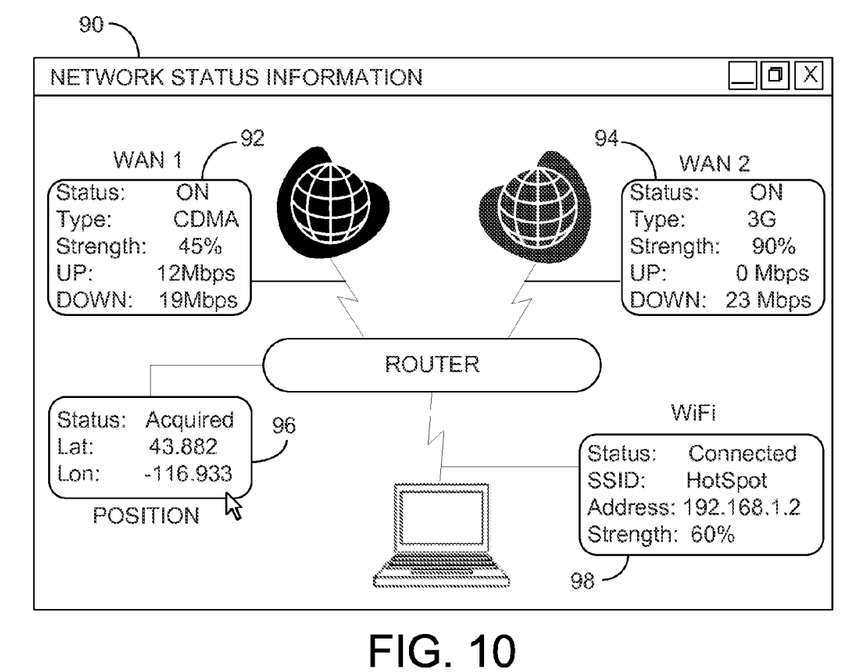
FIGS. 10-11 are exemplary screen views of status information being displayed by a client device according to an embodiment of the present invention.
Figure 11:
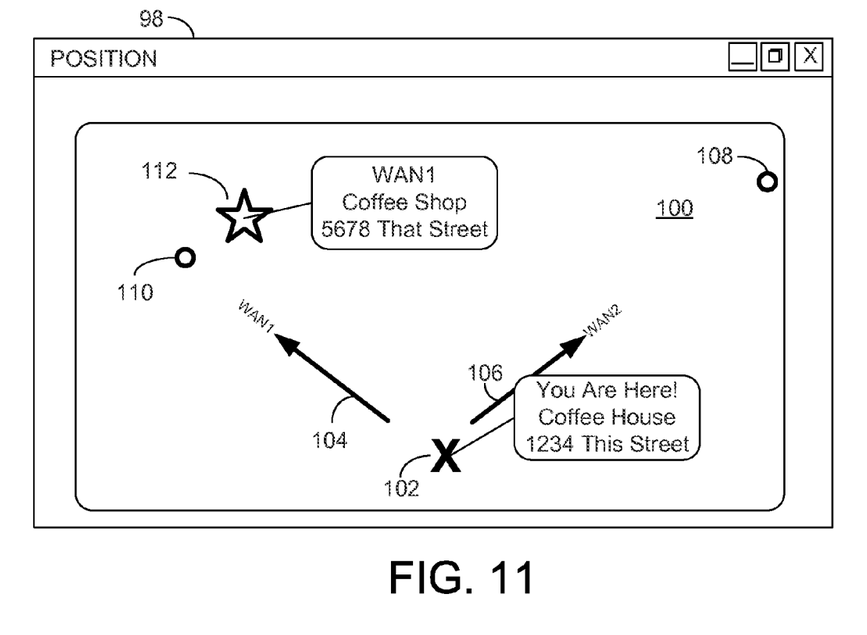

FIGS. 10-11 are exemplary screen views of status information being displayed by an application on a client device according to an embodiment of the present invention. Starting with FIG. 10 screen view 90, labeled "NETWORK STATUS INFORMATION," is shown. Screen view 90 includes various information sections 92-98. In addition to providing textual and visual information, each section 92-98 may also serve as an interface control that when selected like a button or link causes the application to display another screen or take some other action. Screen 90 displays sections 92 and 94 to provide the user status information regarding each of two remote links between the router device and a wide area network such as the internet. Such presumes that the router device is configured to utilize two data exchangers. Section 96 displays position data for one or both of those data exchangers while section 98 informs the user of the status of the local link between the client device and the router device.

Upon the user's selection of section 96 in FIG. 10, the application displays screen 98 seen in FIG. 11. Using position data, screen 98 displays a map showing the user's current location 102. Using repositioning data, the application displays directional arrows indicating a directions for moving closer to cell phone towers 108 and 110 respectively. It is presumed that moving closer to a given cell tower will result in improved signal strength for the data link between a given data exchanger and the wide area network. Using repositioning data, the application also shows a location 112 of a public facility that is located nearer to cell tower 110. Repositioning to location 112 should result in an improved signal strength for the data link while providing a potentially convenient work location.

CONCLUSION

The schematic diagrams of FIGS. 1-3 illustrate exemplary environments in which embodiments of the present invention may be implemented. Implementation, however, is not limited to these environments. The diagrams of FIGS. 4-7 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may also represent in whole or in part a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 8-9 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention.

What is claimed is:

1. A method for communicating network status information of a network, wherein the network comprises a client device connected to a router device via a first link, the router device connected to a data enabled cellular communication device via a second link, and the data enabled cellular communication device connected to a wide area network via a cellular data link, wherein the network status information comprises a state of the cellular data link, the method comprising:

receiving, via the first link, a request for status information from the client device, wherein the request for status information comprises requesting that the router device report the state of the cellular data link to the client device;

in response to the request, polling the data enabled cellular communication device for status information via the second link, the status information identifying the state of the cellular data link and wherein polling the data enabled cellular communication device for status information further comprises polling for repositioning data for the data enabled cellular communication device, the repositioning data indicating one or more of a direction or location for repositioning the data enabled cellular communication device to realize an improved signal strength of the cellular data link;

receiving the status information via the second link; and communicating the status information to the client device via the first link, and wherein the router device is configured to report the state of the cellular data link in response to each request for status information and independent of the state of the cellular data link.

2. The method of claim 1, wherein the data enabled cellular communication device is a first data exchanger and the status information is first status information, the method further comprising:

in response to the request, polling a second data exchanger for second status information via a fourth link between the router device and the second data exchanger, the second status information identifying a state of a fifth link between the second data exchanger and the wide area network;

receiving the second status information via the fourth link; and communicating the second status information to the client device via the first link.

3. The method of claim 1, wherein polling the data enabled cellular communication device for status information further comprises polling the data enabled cellular communication device for one or more of a signal strength of the cellular data link, a data transfer rate of the cellular data link, and position data for the data enabled cellular communication device.

4. The method of claim 1, further comprising providing for installation of an application on the client device from the router device and wherein receiving comprises receiving the request for status information from the application and communicating comprises communicating the status information to the application.

5. A non-transitory computer readable medium having instructions that when executed cause a router device to implement a method for communicating network status information of a network, wherein the network comprises a client device connected to a router device via a first link, the router device connected to a data enabled cellular communication device via a second link, and the data enabled cellular communication device connected to a wide area network via a cellular data link, wherein the network status information comprises a state of the cellular data link, the medium including instructions for:
  receiving, via the first link, a request for status information from the client device, wherein the request for status information comprises requesting that the router device report the state of the cellular data link to the client device;
  in response to the request, polling the data enabled cellular communication device for status information via the second link, the status information identifying the state of the cellular data link and wherein polling the data enabled cellular communication device for status information further comprises polling for repositioning data for the data enabled cellular communication device, the repositioning data indicating one or more of a direction or location for repositioning the data enabled cellular communication device to realize an improved signal strength of the cellular data link;
  receiving the status information via the second link; and
  communicating the status information to the client device via the first link, and wherein the router device is configured to report the state of the cellular data link in response to each request for status information and independent of the state of the cellular data link.

6. The medium of claim 5, wherein the data enabled cellular communication device is a first data exchanger and the status information is first status information, the medium having further instructions for:
  in response to the request, polling a second data exchanger for second status information via a fourth link between the router device and the second data exchanger, the second status information identifying a state of a fifth link between the second data exchanger and the wide area network;
  receiving the second status information via the fourth link; and
  communicating the second status information to the client device via the first link.

7. The medium of claim 5, wherein the instructions for polling the data enabled cellular communication device for status information include instructions for polling the data enabled cellular communication device for one or more of a signal strength of the cellular data link, a data transfer rate of the cellular data link, and position data for the data enabled cellular communication device.

8. The medium of claim 5, having further instructions for providing for installation of an application on the client device from the router device and wherein the instructions for receiving include instructions for receiving the request for status information from the application and the instructions for communicating comprise instructions for communicating the status information to the application.

9. A router device comprising a client interface, a data exchanger interface, a router and an operating state service, wherein:
  the client interface is configured to function as a communication interface between the router device and a client device;
  the data exchanger interface is configured to function as a communication interface between the router device and a data enabled cellular communication device capable of establishing a data link with a wide area network;
  the router is configured to utilize the client interface and the data exchanger interface to route data communications between the client device and the wide area network via data exchanger; and
  the operating state service is configured to:
  receive, via the client interface, a request for status information from the client device, wherein the request for status information comprises requesting that the router device report the state of the data link between the data enabled cellular communication device and the wide area network;
  in response to the request, poll the data enabled cellular communication device for status information via the data exchanger interface and wherein polling the data enabled cellular communication device for status information further comprises polling for repositioning data for the data enabled cellular communication device, the repositioning data indicating one or more of a direction or location for repositioning the data enabled cellular communication device to realize an improved signal strength of the data link;
  receive the status information via the data exchanger interface; and
  communicate the status information to the client device via the client interface, and wherein the router device is configured to report the state of the data link in response to each request for status information and independent of the state of the data link.

10. The router device of claim 9, wherein the data exchanger interface is a first data exchanger interface, the data enabled cellular communication device is a first data exchanger, the data link is a first data link and the status information is first status information, the router device further comprising a second data exchanger interface configured to function as a communication interface between the router device and a second data exchanger capable of establishing a second data link with the wide area network and wherein the operating state service is further configured to:
  in response to the request, poll the second data exchanger for second status information via the second data exchanger interface, the second status information identifying a state of the second data link with the wide area network;
  receive the second status information via the second data exchanger interface; and
  communicate the second status information to the client device via the client interface.

11. The router device of claim 9, wherein the operating state service is operable to poll the data enabled cellular communication device for status information in the form of one or more of a signal strength of the data link, a data transfer rate of the data link, and position data for the data enabled cellular communication device.

12. The router device of claim 9, wherein the operating state service is configured to provide for installation of an application on the client device from the router device and wherein the operating state service is configured to receive the request for status information from the application and to communicate the status information to the application.

* * * * *